May 29, 1962 J. R. HAMILTON 3,036,556
HYDRAULICALLY CONTROLLED GLASS FEEDER
Filed Sept. 6, 1960 3 Sheets-Sheet 1

INVENTOR:
Joseph R. Hamilton,
BY Bair, Freeman & Molinare
ATTORNEYS.

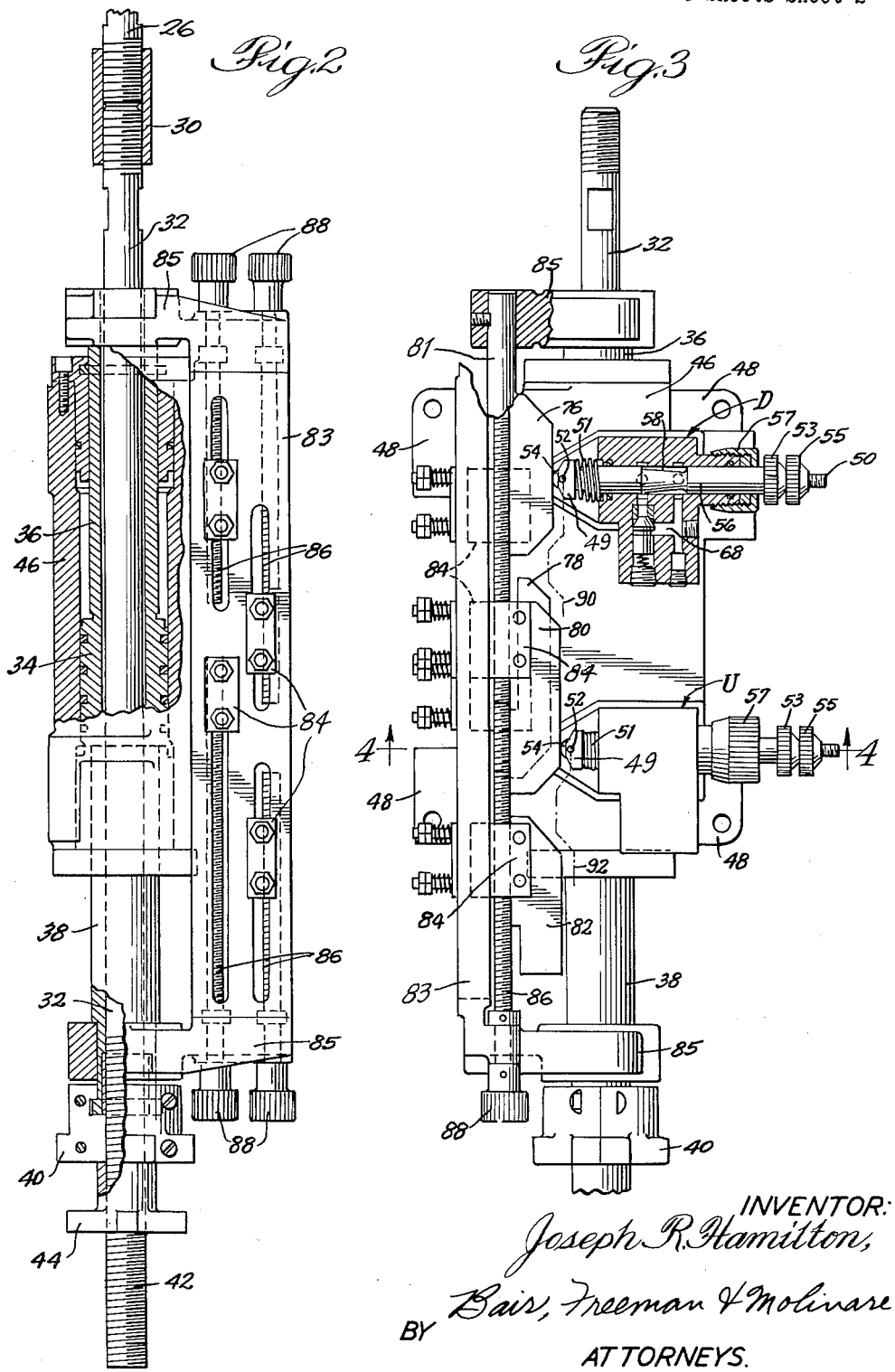

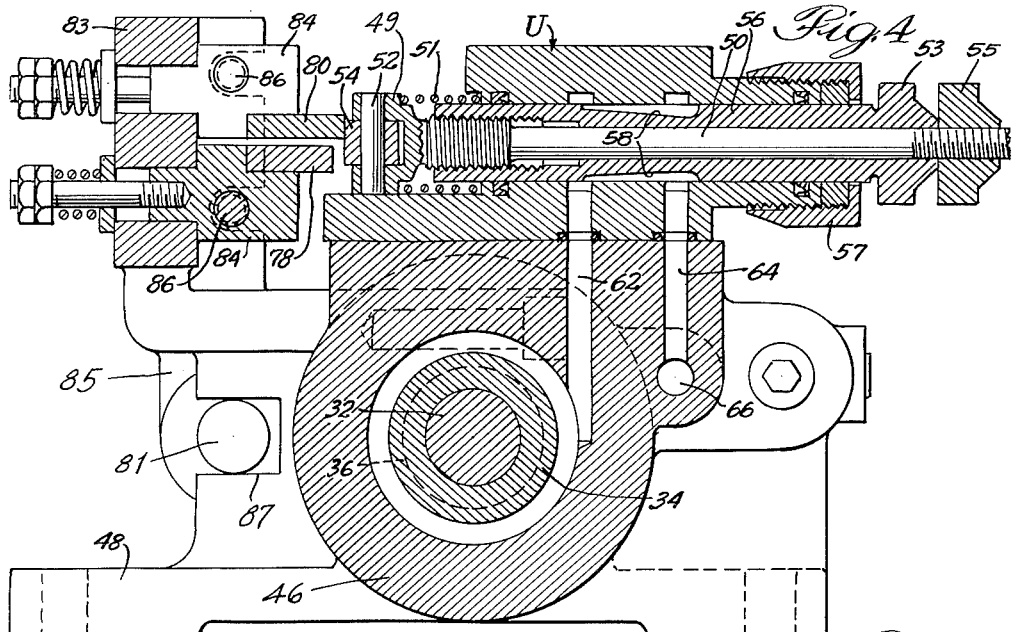
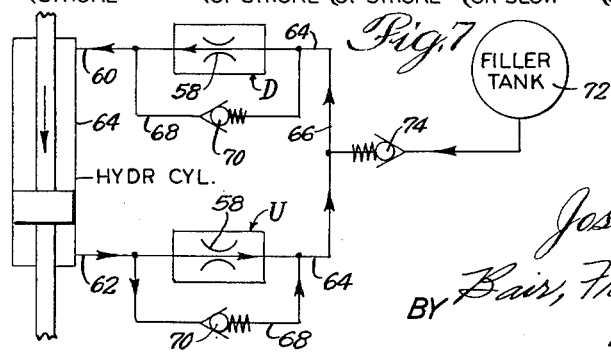

United States Patent Office 3,036,556
Patented May 29, 1962

3,036,556
HYDRAULICALLY CONTROLLED GLASS FEEDER
Joseph R. Hamilton, Anderson, Ind., assignor to Lynch Corporation, Anderson, Ind., a corporation of Indiana
Filed Sept. 6, 1960, Ser. No. 53,940
5 Claims. (Cl. 121—45)

This invention relates to a hydraulically controlled glass feeder for feeding gobs of molten glass to a glassware forming machine.

One object of the invention is to provide a hydraulic control capable of controlling the speed of a gob forming plunger with respect to the orifice of a nose bowl at the end of a forehearth of a glass furnace, the same being adjustable to slow down or speed up any desired portion of the plunger travel.

Another object is to provide hydraulic dash pot means for controlling the reciprocations of a pneumatically reciprocated glass feeder plunger controlled by a valving arrangement and cams for actuating the valves thereof to various positions for short or long periods of slow travel and/or fast travel, and for also stopping the travel if desired.

Still another object is to provide a movement controlling device for a glass feeder comprising a hydraulic cylinder, a piston therein, and control by pass valve connections between the opposite ends of the cylinder combined with cams for actuating the control valves as desired, and adjustments for the cams as well as for the speed of flow of hydraulic fluid through the valves.

With these and other objects in view, my invention consists in the construction, arrangement and combination of the various parts of my hydraulically controlled glass feeder, whereby the objects above contemplated are attained, as hereinafter more fully set forth, pointed out in my claims and illustrated in detail on the accompanying drawings, wherein:

FIG. 2 is an enlarged elevation of the hydraulic movement control device with parts broken away and other parts shown in section.

FIG. 3 is another elevation thereof as taken from the right hand side of FIG. 2 and shows one of the control valves in section.

FIG. 4 is a further enlarged sectional view on the line 4—4 of FIG. 3 to show control valve details and the valve in slow speed position.

FIGS. 5 and 6 are diagrams to illustrate different possible adjustments for the down and up strokes respectively of my hydraulic control device.

FIG. 7 is a hydraulic circuit diagram of my control device.

Figure 1:
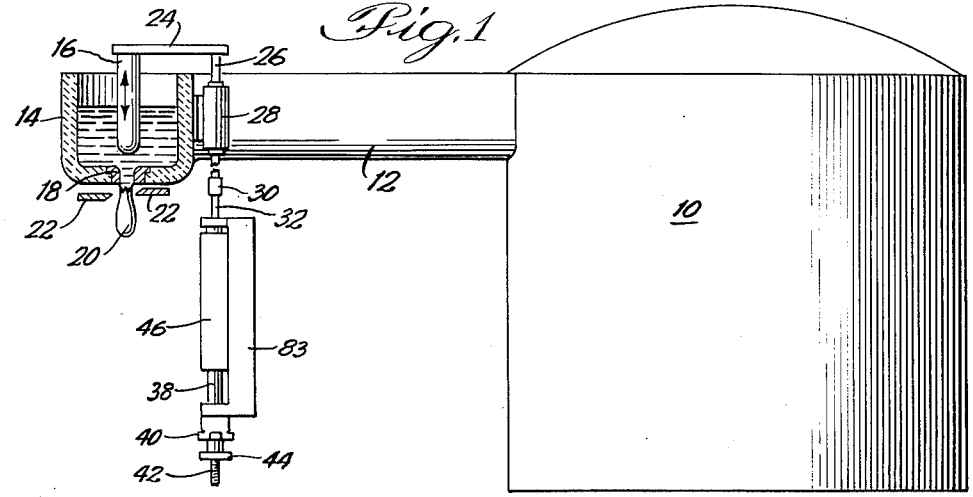
FIG. 1 is a somewhat diagrammatic view of a glass furnace and a glass feeder with my hydraulic movement control device operatively connected with the plunger of the glass feeder.

On the accompanying drawings I have used the reference numeral 10 to indicate a glass furnace, 12 the forehearth thereof and 14 a nose bowl. A plunger 16 is reciprocable in the nose bowl with respect to an orifice plate 18 from which a gob 20 may flow when the plunger is up whereas its flow is substantially stopped when the plunger is down and at which time shear blades 22 shear off the gob and it drops into the mold (not shown) of a glass molding machine.

An arm 24 supports the plunger 16, and the plunger is reciprocated by a pneumatic piston rod 26 extending into a pneumatic cylinder 28 having the usual piston therein and appropriate cycling control valves to effect vertical reciprocations of the piston and thereby the rod 26, but the mechanism for accomplishing this forms no part of my present invention and has therefore not been shown in detail.

My invention comprises a hydraulic control for the reciprocating movements of the pneumatic piston rod 26 which movements are otherwise uncontrolled and sometimes adversely affect the formation and size of the gob 20. On the other hand, it is desirable to control the movement of the plunger 16 by making it adjustably slow during part of its stroke and adjustably fast during another part thereof, or to make it adjustably slow or fast during its entire stroke and to limit the up or down movement if desired. In this connection the movement of the plunger 16 is more or less uniform if my hydraulic control is not provided, but by slowing down the last part thereof as the plunger approaches the orifice in the orifice plate 18, and likewise speeding up the first part of the upward movement and then slowing down the movement produces a thin cross section at the level of the shear blades 22 for better shearing action, a better shaped tail on the gob 20 and a better shaped leading edge on the next gob with greater uniformity of weight of glass in each gob. Depending on the particular composition and temperature of the glass being used, different adjustments are desirable and may be had with my hydraulic movement control device which will now be described.

A coupler 30 is provided at the lower end of the pneumatic piston rod 26 for coupling a hydraulic piston rod 32 thereto. The rod 32 extends through a hydraulic piston 34 located in a hydraulic cylinder 46 and having upper and lower piston rod sleeves 36 and 38 extending out of the ends of the cylinder. An adjusting nut 40 is rotatably and non-axially movable on the lower piston rod sleeve 38 and threaded onto a threaded portion 42 of the piston rod 32. My hydraulic controller is thereby adjustable longitudinally in relation to the piston rod 32, and the adjustment may be retained by a lock nut 44. The cylinder 46 is provided with mounting feet 48 for mounting the hydraulic control device to any suitable stationary object, the nose bowl 14 usually being located overhead and the control device down at a level convenient for making adjustments thereto during operation while the operator is standing on the floor.

Figure 8:
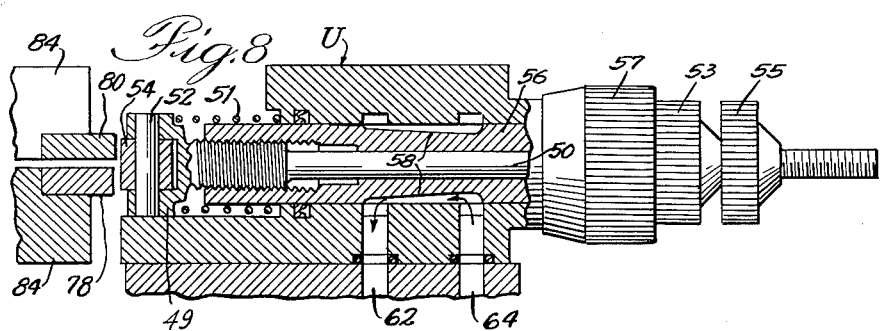
FIG. 8 is a sectional view similar to a portion of FIG. 4 showing the control valve in a high speed position.

A down control valve D and an up control valve U are provided which are identical in construction and will now be described. Referring to FIG. 4, a valve stem 50 has at its left hand end a yoke 49 carrying a pin 52 on which is rotatably mounted a cam roller 54. A spring 51 biases the stem 50 toward the left and thereby the cam roller 54 into engagement with a cam 80. A valve element 56 of tubular character is adjustable on the stem 50, being threaded thereto as illustrated and having fast adjusting knob 53 for this purpose. A lock nut 55 is provided to retain the adjustment once it is made. The valve element 56 has a graduated diameter indicated at 58 for flow control purposes. There is also a slow adjusting knob 57 which is a stop for the knob 53 to engage at times and this stop is adjustable on the body of the control valve. Two characteristic positions of the valve stem 50 (after 53 and 57 have been adjusted) are: (1) with 53 engaging 57 as in FIG. 8 (fast) or (2) determined by cam 80 as in FIG. 4 (slow).

Passageways 60 and 62 lead from the control valves D and U to the upper and lower ends of the cylinder 64 as best shown in FIG. 7, and passageways 64 lead from the valves D and U to a connecting passageway 66. Each control valve is provided with a by pass passage 68 in which is mounted a check or one-way valve 70. A filler tank 72 is provided for makeup purposes to replace any hydraulic fluid leaking from the system, being connected to the passageway 66 through a check valve 74 in the usual manner.

Referring to FIG. 3, a pair of down stroke cams 76 and 78 and a pair of up stroke cams 80 and 82 are provided for controlling the valve stems 50 of the down and up control valves D and U respectively. The cams just referred to are mounted on cam carriers 84 adjustable vertically relative to a cam frame 83. The frame 83 has end brackets 85 connecting the frame to the piston rod sleeves 36 and 38 so that it moves with the piston 34. A guide rod 81 is carried by one of the brackets 85 to coact with a notch 27 of the cylinder 46 (see FIG. 4) to insure alignment of the parts during operation. Four cam adjusting rods 86 terminating in adjusting knobs 88 are rotatably and non-axially movable relative to the frame 83, and screw threaded through the carriers 84 for adjusting them and thereby the cams axially in relation to the piston 34 and thereby relative to the piston rods 26 and 32.

Again referring to FIG. 3 paths 90 and 92 for the rollers 54 of the down and up control valves D and U respectively are illustrated in relation to the cams 76 and 78, and the cams 80 and 82 respectively. The path 90, for instance, indicates a top section for slow speed at which time the valve will be in the position shown in FIGS. 3 and 4, then a center "fast" section where the roller moves to the left because of the incline at the bottom end of the cam 76 and the knob 53 is in engagement with the knob 57, and finally there is a lower section of the path 90 for slow speed of the stroke again (when the incline at the upper end of the cam 78 engages the roller 54 and pushes it toward the right) which then continues for some short distance. The cam 80 for the control valve U similarly starts out with the valve in slow speed position as shown in FIG. 4, then fast speed position as in FIG. 8 and then again in slow speed position. Thus the adjustment shown in FIG. 3 is "slow-fast-slow" for both valves D and U.

Other cam combinations for the down stroke are illustrated in FIG. 5 at the left "slow-fast" (path 90ª), next "fast-slow" (path 90ᵇ), third "slow-fast-slow," path 90 as in FIG. 3 and fourth "constant speed" (path 90ᶜ) which can be fast or slow as desired. The path 90ᶜ is one in which the cams 76 and 78 may be adjusted to act continuously on the control valve D for constant slow speed, or the valve may be adjusted so that neither of the cams act thereon for constant fast speed. Thus a variety of slow and fast adjustments are possible in addition to variation in both the slow and fast adjustments by means of the knobs 53 and 57.

Similarly, FIG. 6 shows cam combinations for the control valve U and the up stroke, the same as the first two for FIG. 5 (omitting the third one) and illustrating the fourth one, with comparable roller paths 92ª, 92ᵇ and 92ᶜ.

Figure 9:
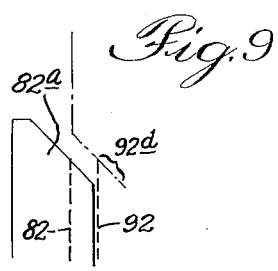
FIG. 9 is a cam and roller diagram similar to a portion of FIG. 3 showing the use of a stop cam instead of slow speed cams only as in FIG. 3.
Figure 10:
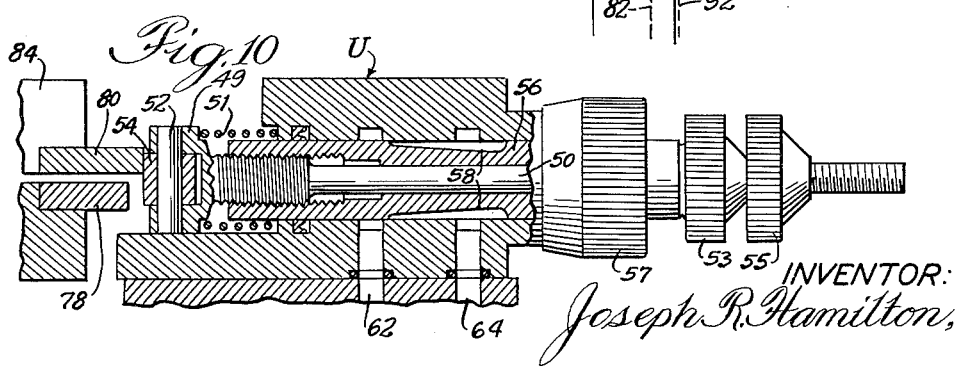
FIG. 10 is a sectional view similar to FIG. 8 showing the control valve in stop position.

The cams 76, 78, 80 and 82 are preferably removably mounted on the cam carriers 84 and may be interchanged with other shapes of cams if desired. One possibility is illustrated in FIG. 9 wherein a stop cam 82ª is substituted for the cam 82 of FIG. 3. The shape of the cam 82ª relative to the cam 82 is illustrated as well as their relative roller paths. The portion 92ᵈ of the roller path caused by the additional height of the cam 82ª relative to the cam 82 produces further movement of the valve element 56 to the right as shown in FIG. 10 where the graduated diameter 58 thereof has passed the passageway 62 thus cutting off the flow of hydraulic fluid and stopping the movement of the entire system of hydraulic control, pneumatic piston rod 26 and plunger 16 independent of the maximum movement of reciprocation of the pneumatic piston in the cylinder 28. Thus a further possibility for adjustment (stopping piston rod 26 before the normal end of its stroke) is had in the design of my hydraulic control.

The cams 76 and 78 it will be noted are lower than the cams 80 and 82 so that the low cams may affect the control valve D only and the high cams the control valve U only without one interfering with the other. After the operator has adjusted the cams to the desired cycle for a specific glass forming job he may record the cam settings in order to duplicate the cycle later, or may provide one long cam that would duplicate the cycle produced by the two adjustable cams, and use it whenever there is return to the specific job mentioned. At the same time the adjustments at 53 and 57 permit varying the slow as well as the fast speed operations independent of the cams which control the amount of fast movement relative to slow movement.

From the foregoing specification it will be obvious that I have provided a hydraulic control which may be adjusted in various speed and positional combinations, and different portions of both the up and down strokes of the plunger 16 relative to the orifice 18 may thus be nicely controlled.

Some changes may be made in the construction and arrangement of the parts of my hydraulic controller without departing from the real spirit and purpose of my invention, and it is my intention to cover by my claims any modified forms of structure or use of mechanical equivalents which may reasonably be included within their scope.

I claim as my invention:

1. For use with a glass feeder or the like having a pneumatically reciprocated element, a movement control device comprising a hydraulic cylinder, a piston reciprocable therein between the ends thereof and operatively connected with said reciprocated element to be reciprocated thereby and in synchronism therewith, passageway means for hydraulically connecting the ends of said cylinder together, a control valve in said passageway means for each end of said cylinder, one to control the movement of said piston and reciprocated element in one direction and the other to control the movement thereof in the opposite direction, each of said control valves comprising a cam actuated valve element which in one position permits only slow flow of hydraulic fluid therethrough and in another position permits fast flow of hydraulic fluid therethrough, each of said control valves having a one-way by pass valve shunting it and opening away from its respective cylinder end, and separate cam means for each of said valve elements, said cam means being movable with said piston and said reciprocated element to shift said valve elements to said one position during a portion of the reciprocating movement thereof and to said another position during another portion of the reciprocating movement thereof.

2. For use with a glass feeder or the like having a pneumatically reciprocated element, a movement control device comprising a hydraulic cylinder, a piston reciprocable therein and operatively connected with said reciprocated element, a control valve for each direction of movement of said piston in said cylinder, each of said control valves comprising a cam actuated valve element which in one position permits only slow flow of hydraulic fluid therethrough and in another position permits fast flow of hydraulic fluid therethrough, each of said control valves being shunted by a one-way by pass valve, and a cam for each of said valve elements operable upon coaction therewith to shift them to one of their positions during a portion of the reciprocation movement of said piston and reciprocated element, and upon non-coaction therewith during another portion of their reciprocating movement causing them to assume their other position, said cams being screw-threadedly adjustable during operation of said reciprocated element in the direction of axial movement of said piston.

3. For use with a resiliently reciprocated element, a movement control device comprising a hydraulic cylinder, a piston reciprocable therein between the ends thereof and operatively connected with said reciprocated element to reciprocate in synchronism therewith, passageway means directly hydraulically connecting the ends of said cylinder together, a filler check valve communicating with said passageway means, a filler tank communicating with said filler check valve, a control valve in said passageway means for each end of said cylinder, one to control their movement in one direction and the other to control their movement in the opposite direction, each of said control valves comprising a cam actuated valve element which in one position permits only slow flow of hydraulic fluid therethrough and in another position permits fast flow of hydraulic fluid therethrough, and a cam for each of said valve elements, said cams being connected with said piston and reciprocated element to move therewith and being adjustable axially of said piston.

4. A movement control device comprising a hydraulic cylinder, a piston reciprocable therein between the ends thereof, passageway means hydraulically connecting the ends of said cylinder together, said passageway means comprising the only hydraulic connection to said cylinder ends, a control valve in said passageway means for each end of said cylinder, one to control the movement of said piston in one direction and the other to control the movement thereof in an opposite direction, each of said control valves comprising a valve element which in one position permits only slow flow of hydraulic fluid therethrough, in another position permits fast flow of hydraulic fluid therethrough and in still another position stops flow of hydraulic fluid therethrough, each of said control valves having a one-way by pass valve opening away from its respective cylinder end, and cam means movable with said piston to shift said valve elements to said one position during a portion of the reciprocation thereof, to said another position during another portion of its reciprocation and to said still another position during a third portion of its reciprocation.

5. A movement control device for a pneumatically reciprocated element comprising a hydraulic cylinder, a piston reciprocable therein between the ends thereof and connected with said reciprocated element, passageway means for hydraulically connecting the ends of said cylinder together, a control valve in said passageway means for each end of said cylinder, one to control the movement of said piston in one direction and the other to control the movement thereof in the opposite direction, each of said control valves comprising a cam actuated valve stem, a valve element adjustable relative thereto for permitting variable slow flow of hydraulic fluid therethrough in one position of said valve stem and in another position permitting fast flow of hydraulic fluid therethrough, a cam for each of said valve stems operable upon coaction therewith to shift said valve elements to one of their positions during a portion of the reciprocation of said piston, upon non-coaction therewith during another portion of its reciprocation to cause them to assume their other position and in still another portion thereof to stop said cam actuated valve stems in their still another position thereof, said cams being adjustable axially of said piston to change the relative slow and fast travel portions of said piston and to determine the stopped position thereof.

References Cited in the file of this patent
UNITED STATES PATENTS

| | | |
|---|---|---|
| 2,000,553 | Alden | May 7, 1935 |
| 2,565,600 | Esterline | Aug. 28, 1951 |
| 2,798,460 | Mathys | July 9, 1957 |
| 2,925,067 | Jones et al. | Feb. 16, 1960 |